US012604304B2

(12) United States Patent
Yang et al.

(10) Patent No.: US 12,604,304 B2
(45) Date of Patent: Apr. 14, 2026

(54) BEAM CONTROL METHOD AND APPARATUS FOR INTELLIGENT SURFACE DEVICE AND ELECTRONIC DEVICE

(71) Applicant: VIVO MOBILE COMMUNICATION CO., LTD., Dongguan (CN)

(72) Inventors: Kun Yang, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 272 days.

(21) Appl. No.: 18/387,236

(22) Filed: Nov. 6, 2023

(65) Prior Publication Data

US 2024/0073882 A1 Feb. 29, 2024

Related U.S. Application Data

(63) Continuation of application No. PCT/CN2022/091230, filed on May 6, 2022.

(30) Foreign Application Priority Data

May 7, 2021 (CN) .......................... 202110497334.4

(51) Int. Cl.
*H04W 72/044* (2023.01)
*H04L 5/00* (2006.01)
*H04W 24/10* (2009.01)

(52) U.S. Cl.
CPC ......... *H04W 72/046* (2013.01); *H04L 5/0048* (2013.01); *H04W 24/10* (2013.01)

(58) Field of Classification Search
CPC ... H04L 5/0048; H04L 5/0053; H04L 5/0023; H04L 5/0051; H04L 5/0007; H04L 5/001;
(Continued)

(56) References Cited

U.S. PATENT DOCUMENTS 5,195,046 A * 3/1993 Gerardi .................. B64D 15/20
73/659
6,075,924 A * 6/2000 Will .................. H01L 21/67706
700/247
(Continued)

FOREIGN PATENT DOCUMENTS

CN 111181615 A 5/2020
CN 111817768 A 10/2020
(Continued)

OTHER PUBLICATIONS

Zhang, Jinming et al., "Channel Estimation for Reconfigurable Intelligent Surface Aided Massive MIMO System", 2020 IEEE 21st International Workshop on Signal Processing Advances in Wireless Communications (SPAWC), 2020, pp. 1-5.

*Primary Examiner* — Ninos Donabed
(74) *Attorney, Agent, or Firm* — The Webb Law Firm

(57) ABSTRACT

A beam control method for the intelligent surface device includes obtaining, by a network side device, first channel information of an active unit of the intelligent surface device, where the first channel information is channel information between the network side device and the active unit; obtaining second channel information of the active unit, where the second channel information is channel information between a terminal and the active unit; and determining control information of a unit array of the intelligent surface device based on the first channel information and the second channel information, where the unit array includes the active unit and a passive unit of the intelligent surface device.

12 Claims, 6 Drawing Sheets

S901

An intelligent surface device performs channel measurement by using an active unit and a network side device

S902

The intelligent surface device performs channel measurement by using the active unit and a terminal

S903

The intelligent surface device obtains control information of a unit array

(58) Field of Classification Search
CPC .... H04L 5/0094; H04W 24/10; H04W 72/23;
H04W 24/08
See application file for complete search history.

(56) References Cited

U.S. PATENT DOCUMENTS

| | | | | |
|---|---|---|---|---|
| 2010/0166038 A1* | 7/2010 | Lee | H04B 7/0628 | |
| | | | 375/267 | |
| 2014/0113669 A1* | 4/2014 | Kuo | H04B 7/0478 | |
| | | | 455/501 | |
| 2015/0139112 A1* | 5/2015 | Park | H04B 7/0478 | |
| | | | 370/329 | |
| 2016/0212643 A1* | 7/2016 | Park | H04B 7/0417 | |
| 2018/0076858 A1* | 3/2018 | Wu | H04B 7/0874 | |
| 2020/0196160 A1* | 6/2020 | Chiang | H04B 17/14 | |
| 2021/0013619 A1 | 1/2021 | Alkhateeb et al. | | |
| 2021/0126359 A1* | 4/2021 | Kim | H04B 7/145 | |
| 2022/0131579 A1* | 4/2022 | Xu | H04B 7/0456 | |
| 2024/0204398 A1* | 6/2024 | Zhu | H01Q 3/22 | |

FOREIGN PATENT DOCUMENTS

| | | |
|---|---|---|
| CN | 112260740 A | 1/2021 |
| CN | 112564752 A | 3/2021 |

* cited by examiner

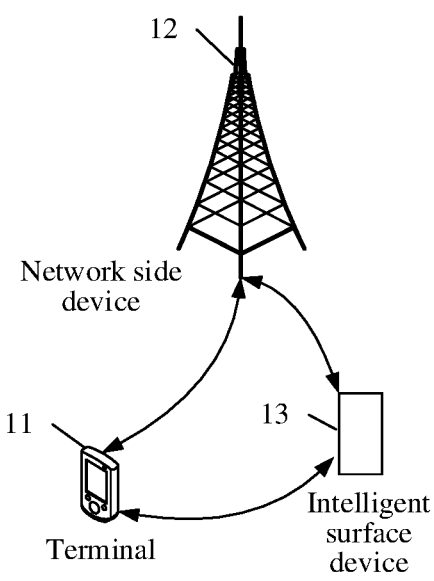

12

Network side
device 11                    13

Terminal

Intelligent
surface
device

FIG. 1

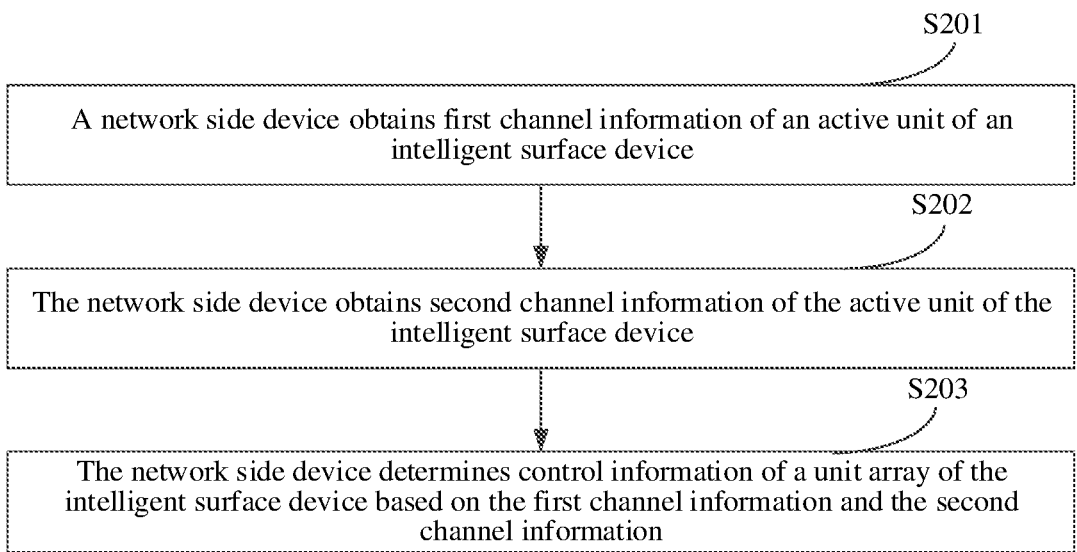

S201

A network side device obtains first channel information of an active unit of an
intelligent surface device

S202

The network side device obtains second channel information of the active unit of the
intelligent surface device

S203

The network side device determines control information of a unit array of the
intelligent surface device based on the first channel information and the second
channel information

FIG. 2

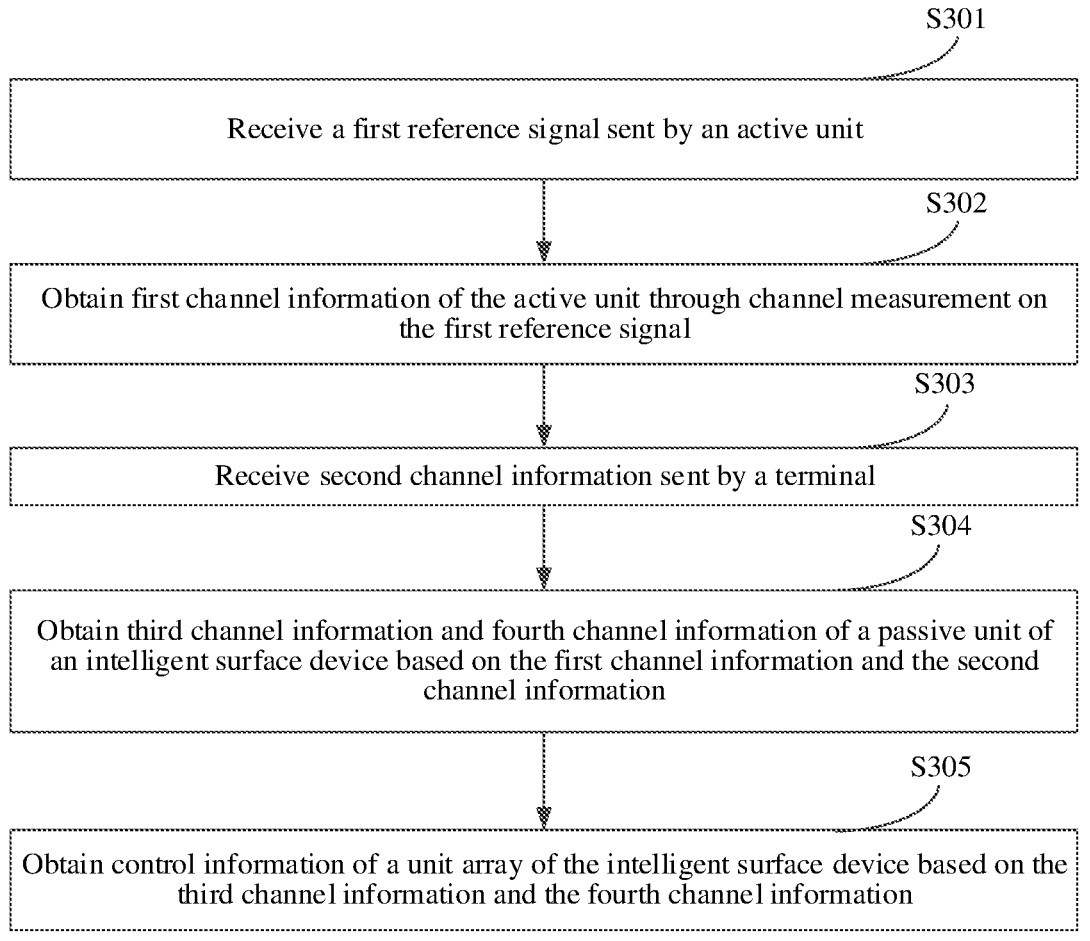

S301

Receive a first reference signal sent by an active unit

S302

Obtain first channel information of the active unit through channel measurement on the first reference signal

S303

Receive second channel information sent by a terminal

S304

Obtain third channel information and fourth channel information of a passive unit of an intelligent surface device based on the first channel information and the second channel information

S305

Obtain control information of a unit array of the intelligent surface device based on the third channel information and the fourth channel information

FIG. 3

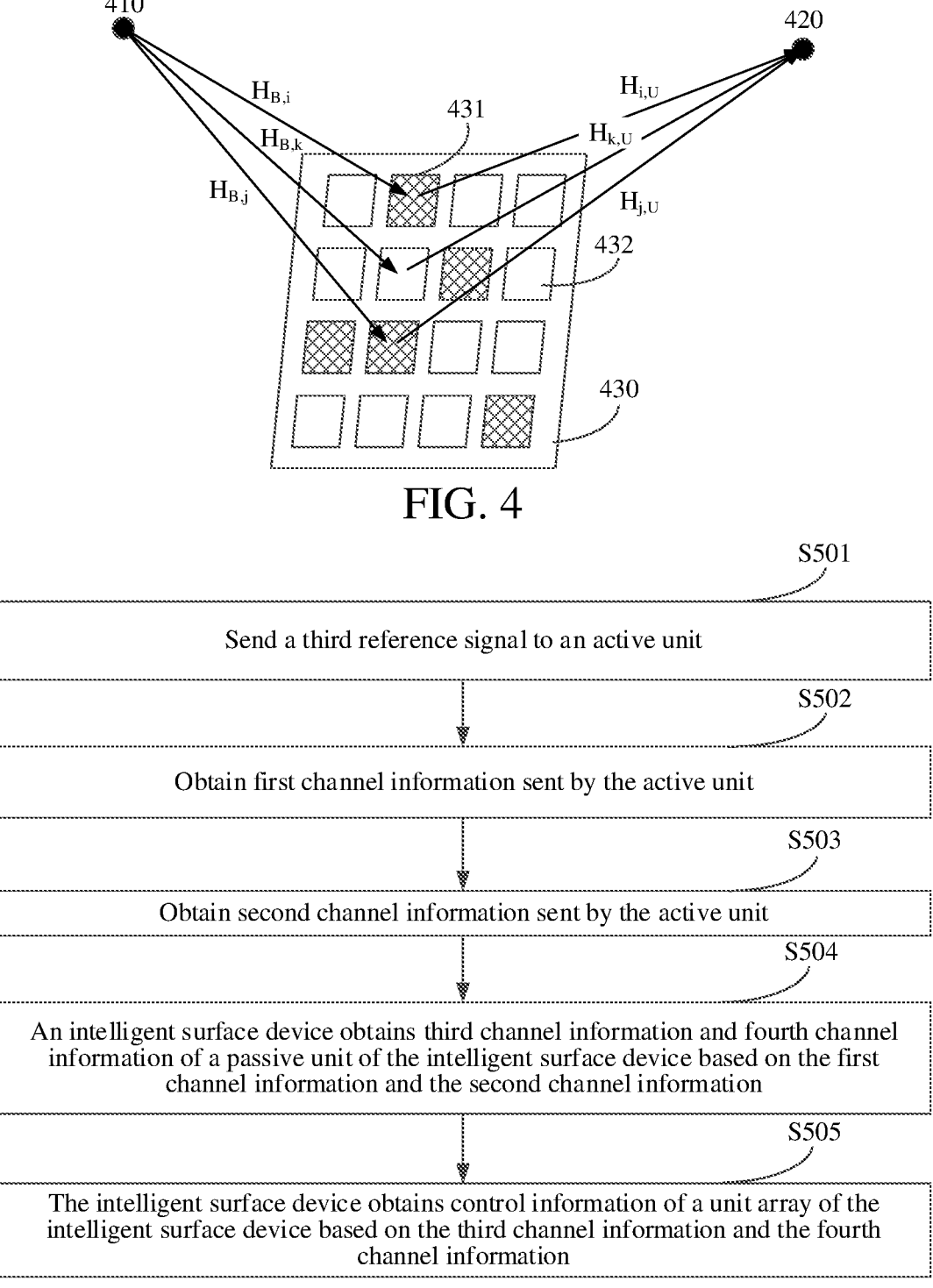

FIG. 4

Send a third reference signal to an active unit ~ S501

Obtain first channel information sent by the active unit ~ S502

Obtain second channel information sent by the active unit ~ S503

An intelligent surface device obtains third channel information and fourth channel information of a passive unit of the intelligent surface device based on the first channel information and the second channel information ~ S504

The intelligent surface device obtains control information of a unit array of the intelligent surface device based on the third channel information and the fourth channel information ~ S505

FIG. 5

BEAM CONTROL METHOD AND APPARATUS FOR INTELLIGENT SURFACE DEVICE AND ELECTRONIC DEVICE

CROSS-REFERENCE TO RELATED APPLICATIONS

This application is a Bypass Continuation Application of International Patent Application No. PCT/CN2022/091230, filed May 6, 2022, and claims priority to Chinese Patent Application No. 202110497334.4, filed May 7, 2021, the disclosures of which are hereby incorporated by reference in their entireties.

BACKGROUND OF THE INVENTION

Field of the Invention

This application belongs to the field of mobile communication technologies, and specifically, relates to a beam control method and apparatus for an intelligent surface device and an electronic device.

Description of Related Art

A special wireless auxiliary device (such as a relay device, a backscatter, a new type of device/a large intelligent surface, or a satellite) in a wireless environment has a function of changing an electromagnetic parameter of the wireless auxiliary device, affecting a channel condition between communication devices. A signal-to-noise and interference ratio (SINR) or a channel response changes with electromagnetic parameters and hardware characteristics of these special devices, causing the channel response to be updated accordingly.

In addition, a large intelligent surface device includes a large amount of passive units and cannot send a related reference signal, which makes it difficult for a base station and a terminal to directly obtain channel information corresponding to each surface unit of the large intelligent surface device. As a result, beam control cannot be accurately performed on the intelligent surface device.

SUMMARY OF THE INVENTION

Embodiments of this application provide a beam control method and apparatus for an intelligent surface device and an electronic device.

According to a first aspect, a beam control method for an intelligent surface device is provided and applied to a network side device. The method includes:

obtaining, by a network side device, first channel information of an active unit of the intelligent surface device, where the first channel information is channel information between the network side device and the active unit;

obtaining, by the network side device, second channel information of the active unit of the intelligent surface device, where the second channel information is channel information between a terminal and the active unit; and determining, by the network side device, control information of a unit array of the intelligent surface device based on the first channel information and the second channel information, where the unit array includes the active unit and a passive unit of the intelligent surface device.

According to a second aspect, a beam control apparatus for an intelligent surface device is provided, including:

a first measurement module, configured to obtain first channel information of an active unit of the intelligent surface device, where the first channel information is channel information between the network side device and the active unit;

a second measurement module, configured for the network side device to obtain second channel information of the active unit of the intelligent surface device, where the second channel information is channel information between a terminal and the active unit; and a control module, configured for the network side device to determine control information of a unit array of the intelligent surface device based on the first channel information and the second channel information, where the unit array includes the active unit and a passive unit of the intelligent surface device.

According to a third aspect, a beam control method for an intelligent surface device is provided and applied to a terminal. The method includes:

in a case that an active unit of the intelligent surface device supports signal sending, obtaining, by a terminal, a second reference signal sent by the active unit; and in a case that the active unit of the intelligent surface device supports signal receiving, sending, by the terminal, a fourth reference signal to the active unit, where the second reference signal or the fourth reference signal is used for obtaining second channel information of the active unit, the second channel information is channel information between the terminal and the active unit, the second channel information is used for, in combination with first channel information, determining control information of a unit array of the intelligent surface device, the unit array includes the active unit and a passive unit of the intelligent surface device, and the first channel information is channel information between a network side device and the active unit.

According to a fourth aspect, a beam control apparatus for an intelligent surface device is provided, including:

a first obtaining module, configured to obtain, in a case that an active unit of the intelligent surface device supports signal sending, a second reference signal sent by the active unit; and a second obtaining module, configured to send, in a case that the active unit of the intelligent surface device supports signal receiving, a fourth reference signal to the active unit, where the second reference signal or the fourth reference signal is used for obtaining second channel information of the active unit, the second channel information is channel information between the terminal and the active unit, the second channel information is used for, in combination with first channel information, determining control information of a unit array of the intelligent surface device, the unit array includes the active unit and a passive unit of the intelligent surface device, and the first channel information is channel information between a network side device and the active unit.

According to a fifth aspect, a beam control method for an intelligent surface device is provided and applied to the intelligent surface device. The method includes:

performing, by the intelligent surface device, channel measurement by using an active unit and a network side device, where the channel measurement of the active unit and the network side device is for obtaining first channel information of the active unit, and the first channel information is channel information between the network side device and the active unit;

performing, by the intelligent surface device, channel measurement by using the active unit and a terminal, where the channel measurement of the active unit and the terminal is for obtaining second channel information, and the second channel information is channel information between the terminal and the active unit; and obtaining, by the intelligent surface device, control information of a unit array, where the control information is obtained based on the first channel information and the second channel information, and the unit array includes the active unit and a passive unit of the intelligent surface device.

According to a sixth aspect, a beam control apparatus for an intelligent surface device is provided, including:

a first communication module, configured to perform channel measurement by using an active unit and a network side device, where the channel measurement of the active unit and the network side device is for obtaining first channel information of the active unit, and the first channel information is channel information between the network side device and the active unit;

a second communication module, configured to perform channel measurement by using the active unit and a terminal, where the channel measurement of the active unit and the terminal is for obtaining second channel information, and the second channel information is channel information between the terminal and the active unit; and an execution module, configured to obtain control information of a unit array, where the control information is obtained based on the first channel information and the second channel information, and the unit array includes the active unit and a passive unit of the intelligent surface device.

According to a seventh aspect, a network side device is provided. The network side device includes a processor, a memory, and a program or an instruction stored in the memory and executable on the processor, and the program or the instruction, when executed by the processor, implements steps of the method according to the first aspect.

According to an eighth aspect, a terminal is provided. The terminal includes a processor, a memory, and a program or an instruction stored in the memory and executable on the processor, and the program or the instruction, when executed by the processor, implements steps of the method according to the third aspect.

According to a ninth aspect, a non-transitory readable storage medium is provided. The non-transitory readable storage medium stores a program or an instruction stored, and the program or the instruction, when executed by the processor, implements steps of the method according to the first aspect, or implements steps of the method according to the third aspect, or implements steps of the method according to the fifth aspect.

According to a tenth aspect, a chip is provided. The chip includes a processor and a communication interface, the communication interface is coupled to the processor, and the processor is configured to run a program or an instruction to implement steps of the method according to the first aspect, or implement steps of the method according to the third aspect, or implement steps of the method according to the fifth aspect.

According to a tenth aspect, a computer program/program product is provided. The computer program/program product is stored in a non-transitory storage medium, and the program/program product is executed by at least one processor to implement steps of the method according to the first aspect, or implement steps of the method according to the third aspect, or implement steps of the method according to the fifth aspect.

BRIEF DESCRIPTION OF THE DRAWINGS

FIG. 1 is a schematic structural diagram of a wireless communication system to which an embodiment of this application is applicable;

FIG. 2 is a schematic flowchart of a beam control method for an intelligent surface device according to an embodiment of this application;

FIG. 3 is a schematic flowchart of another beam control method for an intelligent surface device according to an embodiment of this application;

FIG. 4 is a schematic diagram of a channel estimation method for a passive unit in a beam control method for an intelligent surface device according to an embodiment of this application;

FIG. 5 is a schematic flowchart of another beam control method for an intelligent surface device according to an embodiment of this application;

DESCRIPTION OF THE INVENTION

Figure 6:
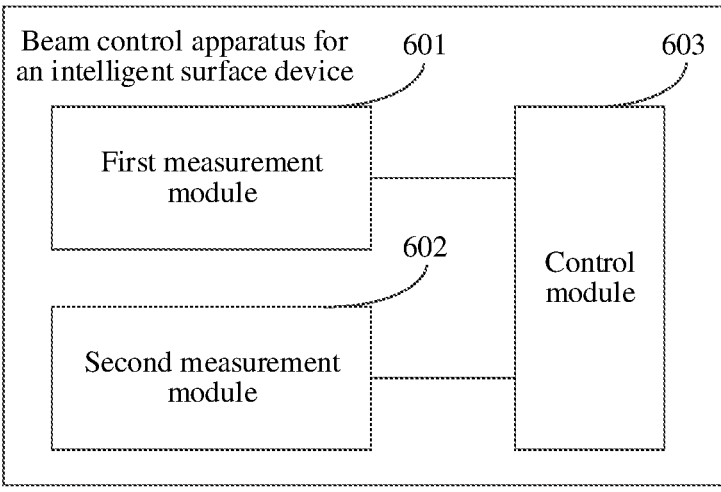
FIG. 6 is a schematic structural diagram of a beam control apparatus for an intelligent surface device according to an embodiment of this application.

The following clearly describes the technical solutions in embodiments of this application with reference to the accompanying drawings in the embodiments of this application. Apparently, the described embodiments are merely some but not all of the embodiments of this application. All other embodiments obtained by a person of ordinary skill in the art based on the embodiments of this application fall within the protection scope of this application.

In the specification and claims of this application, the terms "first", "second", and the like are intended to distinguish between similar objects but do not indicate a particular order or sequence. It should be understood that, the terms so used may be interchanged in an appropriate condition, so that the embodiments of this application can be implemented in an order other than those illustrated or described herein. In addition, objects distinguished by "first" and "second" are usually a same type, and a quantity of the objects is not limited, for example, a first object may be one or may be a plurality. In addition, "and/or" in this specification and the claims indicates at least one of the connected objects. A character "I" usually indicates an "or" relationship between the associated objects.

It should be noted that, the technology described in the embodiments of this application is not limited to a long term evolution (LTE)/LTE-advanced (LTE-A) system, and may be further applied to other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. In the embodiments of this application, the terms "system" and "network" may usually be used interchangeably. The described technology may be applied to the systems and radio technologies mentioned above, and may also be applied to other systems and radio technologies. The following description describes a new radio (NR) system for an exemplary objective, and uses NR terms in most of the following description. However, such technologies may also be applied to applications except an NR system application, such as a 6th generation (6G) communication system.

FIG. 1 is a schematic structural diagram of a wireless communication system to which an embodiment of this application is applicable. The wireless communication system includes a terminal 11, a network side device 12, and an intelligent surface device 13. The terminal 11 may also be referred to as a terminal device or a user equipment (UE). The terminal 11 may be a mobile phone, a tablet computer, a laptop computer referred to as a notebook computer, a personal digital assistant (PDA), a palm personal computer, a netbook, an ultra-mobile personal computer (UMPC), a mobile Internet device (MID), a wearable device or a vehicle user equipment (VUE), a pedestrian user equipment (PUE), or other terminal side devices. The wearable device includes: a smartwatch, a bracelet, an earphone, glasses, and the like. It should be noted that, a specific type of the terminal 11 is not limited in the embodiments of this application. The network side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited. The network side device 12 may include an access network device or a core network device. The access network device 12 may also be referred to as a radio access network device, a radio access network RAN), a radio access network function, or a radio access network unit. The network side device 12 may include a base station, a WLAN access point, a Wi-Fi node, or the like. The base station may be referred to as a NodeB, an evolved NodeB, a base transceiver station (BTS), a radio base station, a radio transceiver, a basic service set (BSS), an extended service set (ESS), a home NodeB, a home evolved NodeB, a transmitting receiving point (TRP), or another suitable term in the field. As long as the same technical effects can be achieved, the base station is not limited by a specific technical term. It should to be noted that, the base station in the NR system is merely used as an example in the embodiments of this application for description, but a specific type of the base station is not limited. The core network device may include, but is not limited to, at least one of the following: a core network node, a core network function, a mobility management function (MME), an access and mobility management function (AMF), a session management function (SMF), a user plane function (UPF), a policy control function (PCF), a policy and charging rules function (PCRF), an edge application server discovery function (EASDF), unified data management (UDM), a unified data repository (UDR), a home subscriber server (HSS), a centralized network configuration (CNC), a network repository function (NRF), a network exposure function (NEF), a local NEF (Local NEF or L-NEF), a binding support function (BSF), an application function (AF), or the like. It should be noted that, a core network device in the NR system is merely used as an example in the embodiments of this application, but a specific type of the core network devices is not limited. The intelligent surface device 13 may be a large intelligent surface (LIS) or a reconfigurable intelligent surface (RIS). The RIS is used as an example in each of the following embodiments. The RIS can dynamically/semi-statically change an electromagnetic characteristic of the RIS, affecting a reflection/refraction behavior of an electromagnetic wave incident on the RIS. The RIS manipulates a reflected wave/refracted wave of the electromagnetic wave, to implement functions such as beam sweeping/beamforming. An operating principle and a device structure of the RIS is described below. The RIS includes an artificial surface of a front-end and a control module of a back-end. The artificial surface of the front-end includes artificial device units that are intensively arranged. Device characteristics of the device units are affected by control signals/bias voltages of devices. Different control signals/bias voltages are corresponding to different reflection coefficients/refraction coefficients. Changes in the reflection coefficients/refraction coefficients affect phases/intensities of reflected signals/refracted signals. Microscopically, each device unit causes an independent reflected/refracted signal. Macroscopically, these signals are superimposed to implement manipulation on the electromagnetic wave. The control signals/bias voltages are provided by the control module of the back-end.

The following describes a beam control method for an intelligent surface device provided in an embodiment of this application in detail with reference to the accompanying drawings by using embodiments and application scenarios thereof.

FIG. 2 is a schematic flowchart of a beam control method for an intelligent surface device according to an embodiment of this application. As shown in FIG. 2, the method may be performed by a network side device. In other words, the method may be performed by software or hardware installed on the network side device. The method may be performed by using the following steps:

Step S201: The network side device obtains first channel information of an active unit of the intelligent surface device, where the first channel information is channel information between the network side device and the active unit.

In this embodiment of this application, the intelligent surface device includes a unit array including device units, and the unit array may include the active unit and a passive unit. A quantity and locations of the active units in the unit array may be set based on actual requirements, and the active units may be arranged in a sparse manner.

Step S202: The network side device obtains second channel information of the active unit of the intelligent surface device, where the second channel information is channel information between a terminal and the active unit.

Step S203: The network side device determines control information of the unit array of the intelligent surface device based on the first channel information and the second channel information, where the unit array includes the active unit and a passive unit of the intelligent surface device.

For the intelligent surface device including the active unit and the passive unit, the beam control method in this embodiment of this application is divided into two stages: A first stage is a channel measurement stage of the active unit, and a second stage is a beam control stage of the intelligent surface device. At the first stage, based on a function of sending and receiving information by the active unit of the intelligent surface device, channel information of each active unit in the intelligent surface device may be obtained by performing channel measurement based on the active unit. The channel information includes the first channel information between the active unit and the network side device and the second channel information between the active unit and the terminal. At the second stage, beamforming is performed on the intelligent surface device based on the obtained channel information, to obtain the control information of the unit array of the intelligent surface device. The control information may include an operating status of each unit in the unit array.

A configuration of the intelligent surface device for simulating forwarding beams can be determined based on the control information. Subsequently, a beamforming configuration of the base station and the terminal can be determined by performing channel measurement between the base station and the terminal.

There is no sequence for step S201 and step S202, which may be performed at the same time, or may be performed separately based on respective corresponding measurement periods. This embodiment of this application are merely described by using an example of step S201 before step S202.

In an implementation, because relative locations of the network side device and an RIS device is fixed, a channel changes slowly. Therefore, a first measurement period for obtaining the first channel information may be long, and a second measurement period for obtaining the second channel information may be short, which may depend on a moving speed of the terminal and environmental variations. For example, a configuration of a channel state information (CSI) measurement period of the terminal may be used as a reference of the second measurement period, and the second measurement period may be equal to an integer multiple of the CSI measurement period. However, within the first measurement period, a plurality of second measurement periods may be included, and measurement is performed on a plurality of terminals in different directions.

In this way, the beam control method for the intelligent surface device is provided in this embodiment of this application. The network side device is used to obtain the first channel information and the second channel information of the active unit of the intelligent surface device, and then determine the control information of the unit array of the intelligent surface device based on the first channel information and the second channel information, which improves efficiency of channel measurement and implements accurate beam control on the intelligent surface device, and can support generation of forwarded beams of a complex intelligent surface device of multi-terminal and multi-base station.

FIG. 3 is a schematic flowchart of another beam control method for an intelligent surface device according to an embodiment of this application. As shown in FIG. 3, the method may be performed by a network side device. In other words, the method may be performed by software or hardware installed on the network side device. An active unit of the intelligent surface device may be of various types, and may be an active unit having a function of signal sending and/or receiving. In a case that the active unit supports signal sending, that is, the active unit is an active unit having a function of signal sending or an active unit supporting functions of signal sending and receiving, the method may be performed by using the following steps.

Step S301: Receive a first reference signal sent by the active unit.

Step S302: Obtain first channel information of the active unit through channel measurement on the first reference signal.

In an implementation, in a case that the active unit supports signal sending, the active unit may be used to send the first reference signal to the network side device. The network side device performs channel measurement on the received first reference signal, to obtain the first channel information of the active unit.

A parameter of the first reference signal may be configured by the network side device.

Step S303: Receive second channel information sent by a terminal, where the second channel information is obtained by the terminal through channel measurement on a second reference signal, and the second reference signal is sent by the active unit to the terminal.

In an implementation, in a case that the active unit supports signal sending, the active unit may be used to send the second reference signal to the terminal. The terminal performs channel measurement on the received second reference signal, to obtain the second channel information of the active unit and send the second channel information to the network side device.

A parameter of the second reference signal may also be configured by the network side device, and the network side device informs the terminal of the configured parameter at the same time. The parameter is carried by information such as downlink control information (DCI), a medium access control element (MAC CE), or radio resource control (RRC).

The configuration parameters configured by the network side device for the first reference signal and the second reference signal may include parameters such as a time-frequency resource of the reference signal, a reference signal sequence and a port, and precoding.

The first reference signal and the second reference signal may be various types of reference signals. In an implementation, a reference signal includes at least one of the following:

a synchronization signal and PBSH block (SSB);

a channel state information reference signal (CSI-RS);

a demodulation reference signal (DMRS), where the DMRS may be a DMRS of a physical downlink shared channel (PDSCH), a physical downlink control channel (PDCCH), or a physical uplink shared channel (PUSCH), that is, a DMRS for PDSCH, a DMRS for PDCCH, or a DMRS for PUSCH;

a position reference signal (PRS);

a sounding reference signal (SRS);

a physical random access channel (PRACH) reference signal;

a side link reference signal; or a dedicated reference signal for channel measurement by the intelligent surface device, which may include a dedicated first reference signal and/or a dedicated second reference signal.

The first reference signal sent by the network side device and second reference signals sent by different terminals may be distinguished by using different ports. In an implementation, the reference signals are distinguished by adopting at least one manner in the following:

time division multiplexing; for example, the reference signals may be sent on different OFDM symbols;

frequency division multiplexing; for example, the reference signals may be sent on different frequency domain resources of a same OFDM symbol;

code division multiplexing; for example, different sequences are used to generate the reference signals; and space division multiplexing or beam sweeping. The active unit may send the first reference signal and/or the second reference signal by adopting a manner of beam sweeping or beam training. The network side device and the terminal respectively uses a beam with best signal quality as a communication beam through channel measurement, to obtain the first channel information and the second channel information.

Optionally, the first reference signal and the second reference signal have a same frequency bandwidth.

Step S304: Obtain third channel information and fourth channel information of a passive unit of the intelligent surface device based on the first channel information and the second channel information, where the third channel information is channel information between the network side device and the passive unit, and the fourth channel information is channel information between the terminal and the passive unit.

In an implementation, the network side device may perform channel estimation on the passive unit of the RIS device based on the first channel information and the second channel information of the active unit of the RIS device, to obtain the third channel information and the fourth channel information of the passive unit. The third channel information and the fourth channel information of the passive unit may be obtained by adopting a plurality of estimation methods. In an implementation, the third channel information and the fourth channel information of the passive unit of the intelligent surface device are obtained by using an interpolation algorithm based on the first channel information and the second channel information. For the interpolation algorithm, an example is as follows:

As shown in FIG. 4, a network side device 410, a terminal 420, and an RIS device 430 are included in the figure. The RIS device 430 includes active units 431 and passive units 432. Channel information of active units i and j are separately obtained through channel measurement, including first channel information $H_{B,i}$ and second channel information $H_{i,U}$ of the active unit i, and first channel information $H_{B,j}$ and second channel information $H_{j,U}$ of the active unit j. Channel estimation is performed on a passive unit k between the active unit i and j based on the $H_{B,i}$, $H_{i,U}$, $H_{B,j}$, and $H_{j,U}$, to obtain third channel information $H_{B,k}$ and fourth channel information $H_{k,U}$ of the passive unit k. The third channel information $H_{B,k}$ and the fourth channel information $H_{k,U}$ may be obtained by using the interpolation algorithm. For example, $H_{B,k}=\frac{1}{2}(H_{B,i}+H_{B,j})$ and $H_{k,U}=\frac{1}{2}(H_{i,U}+H_{j,U})$ may be obtained by using the interpolation algorithm. There are various types of interpolation algorithms, for example, wiener filtering, nonlinear interpolation, and the like. This is not specifically limited herein.

Still as shown in FIG. 4, if the intelligent surface performs channel estimation by adopting a manner of beam sweeping, the first channel information represents energy intensities of beams that are of the active units of the intelligent surface and that are received by the network side device, and the second channel information represents energy intensities of beams that are of the active units of the intelligent surface and that are received by the terminal device. The network side device selects, based on the first channel information, beams corresponding to one or more measurement results with strongest energy as a beam from the network side device to the intelligent surface; and selects, based on the second channel information, beams corresponding to one or more measurement results with strongest energy as a beam from the terminal device to the intelligent surface. Relative phase relationships between channels of the active units, a phase difference between $H_{B,i}$ and $H_{B,j}$ and a phase difference between $H_{i,U}$ and $H_{j,U}$, are determined based on beam codebooks of the active units of the intelligent surface. In some embodiments, a phase difference between channels $H_{B,i}*H_{i,U}$ and from the network side device to the active unit of the intelligent surface and then to the terminal device in cascading channels may be determined. Similarly, a phase difference of cascading channels from the network side device to the passive unit of the intelligent surface and then to the terminal device may be determined by using the interpolation algorithm. The control information of the intelligent surface is calculated based on the phase difference between the cascading channels.

In an implementation, the first channel information and the second channel information may be correlations between channels of the active units, for example, channel measurement results of the active units that are obtained by beam sweeping or beam training. Similarly, the third channel information and the fourth channel information of the passive units that are obtained by estimation by using the interpolation algorithm may also be correlations between the passive units.

In an implementation, a synchronization process is completed once the RIS device accesses a cell. After the RIS device is in time frequency synchronization with the network side device, the method further includes:

obtaining a device parameter reported by the intelligent surface device, where the device parameter includes at least one of the following:

a device type, where the device type may include: a purely passive RIS device including only the passive units, a purely active RIS device including only the active units, and an active-passive hybrid RIS device including the active units and the passive units;

a device size;

a type of the active unit;

a location of the active unit;

a quantity of active units;

a capability of the active unit, which includes supporting only signal receiving, supporting only signal sending, or supporting both signal sending and receiving; or a capability of the passive unit, which includes a type of the passive unit, for example, a phase control type and an amplitude control type, and may include a quantization precision of a control parameter of the passive unit, for example, a bit length of control information for controlling a state of the passive unit. For example, the passive unit is an RIS unit of the phase control type, and a state of the RIS unit is controlled by control information of 1 bit. A system may consider that control information "0" is corresponding to a case that a phase of a reflected signal is continuous relative to a phase of an incident signal, and control information "1" is corresponding to a case that the phase of the reflected signal is 180° from the phase of the incident signal; or consider that a phase of a reflected signal corresponding to the control information "0" is 180° from a phase of a reflected signal corresponding to the control information "1".

Step S305: Obtain the control information of the unit array of the intelligent surface device based on the third channel information and the fourth channel information.

In an implementation, the network side device obtains, based on channel information of device units, including channel information of the active units and the passive units, or based on only channel information of the passive units, the control information of the unit array of the RIS device. The channel information is for obtaining a target forwarded beam from the RIS device. The target forwarded beam may be a single beam pointing to a terminal or a group of terminals, or may be beams in a plurality of directions that points to a plurality of terminals or a plurality of groups of terminals in a plurality of directions.

In an implementation, after step S305, the method further includes:

sending the control information of the unit array to the intelligent surface device, where the control information includes: an operating status of each passive unit of the intelligent surface device. The control information may be carried in DCI, a MAC CE, or RRC.

In an implementation, after determining an initial beam of the RIS device based on the obtained control information of the unit array, refinement may be performed on the beam of the RIS device. The network side device configures several finer beams for the RIS device in the sent control information. The finer beams are referred to as beams with different beam phases or different beam directions, and may be obtained by proper correction on the basis of the initial beam. The network side device may configure a time parameter for performing beam refinement for the RIS device, including a plurality of time units, and each time unit is corresponding to one finer beam described above. For beam refinement, the network side device may configure configuration information corresponding to beam measurement for the terminal, including a reference signal time frequency resource, a port number, and the like. The network side device or the terminal sends a reference signal. The terminal or the network side device receives the reference signal, performs beam measurement, and determine proper finer beams based on a measurement result.

In an implementation, the network side device may send a parameter requirement to the intelligent surface device, where the parameter requirement is used for enabling the intelligent surface device to determine the operating status of each passive unit of the intelligent surface device.

The parameter requirement includes at least one of the following:

a beam direction;

a channel measurement result between a base station and the terminal; or powers and phase relationships of a plurality of beams.

The intelligent surface device obtains, based on the received parameter requirement in combination with the channel information of the device units, including the channel information of the active units and the passive units, or based on only the channel information of the passive units, the control information of the unit array of the RIS device. The channel information is for obtaining the target forwarded beam from the RIS device.

In an implementation, after step S305, the method further includes:

The network side device determines a beamforming parameter of the network side device and/or the terminal through channel measurement. The channel measurement may be performed according to a protocol procedure.

In this way, the beam control method for the intelligent surface device is provided in this embodiment of this application. In a case that the active unit supports signal sending, the active unit sends the first reference signal and the second reference signal to the network side device and the terminal, the first channel information and the second channel information of the active unit are separately obtained through channel measurement, channel estimation is performed on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

FIG. 5 is a schematic flowchart of another beam control method for an intelligent surface device according to an embodiment of this application. As shown in FIG. 5, the method may be performed by a network side device. In other words, the method may be performed by software or hardware installed on the network side device. In a case that the active unit supports signal receiving, that is, the active unit is an active unit having a function of signal receiving or an active unit supporting functions of signal sending and receiving, the method may be performed by using the following steps.

Step S501: Send a third reference signal to the active unit.

Step S502: Obtain first channel information sent by the active unit, where the first channel information is obtained by the active unit by performing channel measurement on the third reference signal.

In an implementation, in a case that the active unit supports signal receiving, the network side device may be used to send the third reference signal to the active unit. The active unit performs channel measurement on the received third reference signal, to obtain the first channel information of the active unit.

A parameter of the third reference signal may be configured by the network side device.

In an implementation, after obtaining the first channel information of the active unit, the RIS device may send the first channel information to the network side device by using the active unit.

Step S503: Obtain second channel information sent by the active unit, where the second channel information is obtained by the active unit by performing channel measurement on a fourth reference signal, and the fourth reference signal is sent by a terminal to the active unit.

In an implementation, in a case that the active unit supports signal receiving, the terminal may be used to send the fourth reference signal to the active unit. The active unit performs channel measurement on the received fourth reference signal, to obtain the second channel information of the active unit.

A parameter of the fourth reference signal may be configured by the network side device, and the network side device informs the terminal of the configured parameter at the same time.

The configuration parameters configured by the network side device for the third reference signal and the fourth reference signal may include parameters such as a time-frequency resource of the reference signal, a reference signal sequence and a port, and precoding.

In an implementation, after obtaining the second channel information of the active unit, the RIS device may send the second channel information to the network side device by using the active unit.

The third reference signal and the fourth reference signal may adopt same types and be sent in same manners as the first reference signal and the second reference signal.

In an implementation, the fourth reference signal may be an SSB, a CSI-RS, a DMRS for PDSCH, a DMRS for PDCCH, a PRS, or a dedicated reference signal for channel measurement by the intelligent surface device.

In an implementation, the third reference signal may be an SRS, a PRACH reference signal, a DMRS for PUSCH, a side link reference signal, or a dedicated reference signal for channel measurement by the intelligent surface device.

In an implementation, there may be multipath effect in a wireless environment, that is, an object in the environment reflects or refract a reference signal sent by the network side device or the terminal, and the active unit receives same reference signals with different transmission delays and different amplitudes from different transmission paths. However, because channel responses of different transmission paths change randomly, effect of non-line of sight may be offset by a plurality of times of measurement and average, measurement results obtained after performing channel measurement on only reference signals of line of sight or paths with strong signals are reserved, that is, the first channel information and the second channel information.

Step S504: The intelligent surface device obtains third channel information and fourth channel information of a passive unit of the intelligent surface device based on the first channel information and the second channel information, where the third channel information is channel information between the network side device and the passive unit, and the fourth channel information is channel information between the terminal and the passive unit.

In an implementation, the RIS device may perform channel estimation on the passive units of the RIS device based on the first channel information and the second channel information of the active unit, to obtain the third channel information and the fourth channel information of each passive unit.

The third channel information and the fourth channel information of the passive unit may be obtained by adopting a plurality of estimation methods. In an implementation, the third channel information and the fourth channel information of the passive unit of the intelligent surface device are obtained by using an interpolation algorithm based on the first channel information and the second channel information. The interpolation algorithm may be linear interpolation, wiener filtering, nonlinear interpolation, and the like. This is not specifically limited herein.

In an implementation, after the RIS device obtains the first channel information and the second channel information, by performing channel measurement on the active unit, the method further includes:

reporting the first channel information and/or the second channel information to the network side device. The network side device obtains, based on the received first channel information and second channel information, the third channel information and the fourth channel information of the passive unit of the intelligent surface device, to perform the method embodiment of steps S304 and S305 in FIG. 3, and obtain the same technical effects. Repetition is not described in detail herein again.

The first channel information and/or the second channel information may be reported by the RIS device in a plurality of manners. In an implementation, at least one of the following manners may be used:

directly reporting the first channel information and/or the second channel information of all active units;

reporting relative ratios of channel information between the active units, for example, reporting a ratio and a relative phase difference of first channel information HB,o of an active unit o and the first channel information HB,o of the active unit o and first channel information HB,i of an active unit i, and reporting a ratio and a relative phase difference of second channel information HU,o and HU,o of the active unit o and second channel information HU,i of the active unit i, where the active unit is a reference signal of an active unit group, and a location of the active unit o in the intelligent surface is determined by the intelligent surface or determined by the network side device in combination with the intelligent surface;

reporting relative ratios between the channel information, such as a ratio of HB,i and HU,i;

reporting direction information of the reference signal, such as angle-of arrival (AOA) and AOZ information of the third reference signal sent by the network side device, AOA and AOZ information of the fourth reference signal sent by the terminal, and signal strength at a corresponding angle; or reporting according to another channel information compression algorithm.

In an implementation, after the RIS device accesses a cell, the method further includes:

reporting a device parameter of the RIS device, where the device parameter includes at least one of the following:

a device type;

a device size;

a type of the active unit;

a location of the active unit;

a quantity of active units;

a capability of the active unit; or a capability of the passive unit.

Step S505: The intelligent surface device obtains control information of a unit array of the intelligent surface device based on the third channel information and the fourth channel information.

In another implementation, the network side device may send a parameter requirement to the intelligent surface device, where the parameter requirement is used for enabling the intelligent surface device to determine the operating status of each passive unit of the intelligent surface device intelligent surface device.

The parameter requirement includes at least one of the following:

a beam direction;

a channel measurement result between a base station and the terminal; or powers and phase relationships of a plurality of beams.

The intelligent surface device obtains, based on the received parameter requirement in combination with the channel information of the device units, including the channel information of the active units and the passive units, or based on only the channel information of the passive units, the control information of the unit array of the RIS device. The channel information is for obtaining the target forwarded beam from the RIS device.

In an implementation, after the RIS device determines an initial beam of the RIS device based on the obtained control information of the unit array, refinement may be performed on the beam of the RIS device. The network side device configures several finer beams for the RIS device in the sent control information. The finer beams are referred to as beams with different beam phases or different beam directions, and may be obtained by proper correction on the basis of the initial beam. The network side device may configure a time parameter for performing beam refinement for the RIS device, including a plurality of time units, and each time unit is corresponding to one finer beam described above. For beam refinement, the network side device may configure configuration information corresponding to beam measurement for the terminal, including a reference signal time frequency resource, a port number, and the like. The network side device or the terminal sends a reference signal. The terminal or the network side device receives the reference signal, performs beam measurement, and determine proper finer beams based on a measurement result.

In an implementation, after step S505, the method further includes:

The network side device determines a beamforming parameter of the network side device and/or the terminal through channel measurement. The channel measurement may be performed according to a protocol procedure.

In this way, the beam control method for the intelligent surface device is provided in this embodiment of this application. In a case that the active unit supports signal receiving, the network side device and the terminal respectively send the third reference signal and the fourth reference signal to the active unit, the first channel information and the second channel information of the active unit are separately obtained through channel measurement, the RIS device performs channel estimation on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

It should be noted that, in the beam control method for the intelligent surface device provided in this embodiment of this application, an execution subject may be a beam control apparatus for the intelligent surface device, or a beam control module, in the beam control apparatus for the intelligent surface device, that is configured to perform the beam control method for the intelligent surface device. In this embodiment of this application, the beam control apparatus for the intelligent surface device provided in this embodiment of this application is described by using an example in which the beam control apparatus for the intelligent surface device performs the beam control method for the intelligent surface device.

Based on the foregoing embodiments, in another implementation, the beam control method for the intelligent surface device provided in this embodiment of this application may include the following steps.

Step 1: Perform channel measurement between the network side device and the RIS device, and obtain the first channel information based on a channel measurement result.

In an implementation, the first reference signal is sent to the active unit by using the network side device, and the active unit performs channel measurement on the received first reference signal, to obtain the first channel information.

In another implementation, the active unit sends the third reference signal to the network side device, and the network side device performs channel measurement on the third reference signal, to obtain the first channel information. The third reference signal is sent in a manner of time division multiplexing, frequency division multiplexing, code division multiplexing, or the like.

In another implementation, the active units send the reference signals in a manner of beam sweeping, and the network side device measures beams sent by the active units and determines a beam with best signal quality as a beam corresponding to the first channel information.

Step 2: The network side device sends the control information to the RIS device, so that the RIS device obtains the operating status of each unit in the unit array, where the control information may be carried in DCI, a MAC CE, or RRC.

In an implementation, the control information may be a plurality pieces of optional configuration information of the passive units in the unit array of the RIS device, which respectively correspond to a plurality of beam directions in which the RIS device forwards signals.

In another implementation, the control information may be beam directions in which a plurality of RIS devices forward signals and beams (corresponding to beams obtained after the active units perform beam sweeping in step 1) the active units of the RIS. The control module of the RIS device generates, based on the channel information obtained through channel measurement in step 1 or beam information that is of the active units of the RIS and that is configured by the network side device in combination with beam directions in which the RIS device forwards signals and that is configured by the network side device, configuration information of the passive units in the unit array of the RIS device.

In an implementation, the first channel information from the network side device to each active unit and relative information between channels may be determined based on channel measurement results in step 1 or a codebook of beam sweeping. The third channel information from the network side device to each passive unit and the relative information between the channels may be determined by using the interpolation algorithm. Phases required by the passive units in the unit array or relative phase requirements may be obtained by calculation based on the beam directions in which the RIS device forwards signals and that is configured by the network side device. The operating status of each passive unit may be determined based on the foregoing information.

Step 3: The RIS device forwards beam sweeping.

The network side device sends the control information, to configure operation time periods of beams for the plurality of RIS device to forward signals.

The network side device sends a plurality of reference signals corresponding to the configured operation time periods of beams for the plurality of RIS device to forward signals.

The terminal receives, based on the configuration information of the network side device, the plurality of reference signals, measures signal quality, and feeds back measurement results to the network side device and/or the RIS device.

The network side device receives the measurement results of the terminal, determines the beam directions of the RIS device, and configures determined results for the RIS device.

The beam control apparatus for the intelligent surface device provided in this embodiment of this application can implement the method embodiments shown in FIG. 3 to FIG. 5, and achieve the same technical effects. Repetition is not described in detail herein again.

FIG. 6 is a schematic structural diagram of a beam control apparatus for an intelligent surface device according to an embodiment of this application. As shown in FIG. 6, the apparatus includes: a first measurement module 601, a second measurement module 602, and a control module 603.

The first measurement module 601 is configured to obtain first channel information of an active unit of the intelligent surface device, where the first channel information is channel information between the network side device and the active unit. The second measurement module 602 is configured for the network side device to obtain second channel information of the active unit of the intelligent surface device, where the second channel information is channel information between a terminal and the active unit. The control module 603 is configured for the network side device to determine control information of a unit array of the intelligent surface device based on the first channel information and the second channel information, where the unit array includes the active unit and a passive unit of the intelligent surface device.

In this way, the beam control apparatus for the intelligent surface device is provided in this embodiment of this application. The beam control apparatus obtains the first channel information and the second channel information of the active unit of the intelligent surface device, and then determines the control information of the unit array of the intelligent surface device based on the first channel information and the second channel information, which improves efficiency of channel measurement and implements accurate beam control on the intelligent surface device, and can support generation of forwarded beams of a complex intelligent surface device of multi-terminal and multi-base station.

Based on the foregoing embodiment, the control module is configured to:

obtain third channel information and fourth channel information of the passive unit of the intelligent surface device based on the first channel information and the second channel information, where the third channel information is channel information between the network side device and the passive unit, and the fourth channel information is channel information between the terminal and the passive unit; and obtain the control information of the unit array of the intelligent surface device based on the third channel information and the fourth channel information.

In some embodiments, in a case that the active unit supports signal sending, the first measurement module is configured to:

receive a first reference signal sent by the active unit; and obtain the first channel information of the active unit through channel measurement on the first reference signal.

In some embodiments, in a case that the active unit supports signal sending, the second measurement module is configured to:

receive the second channel information sent by the terminal, where the second channel information is obtained by the terminal through channel measurement on a second reference signal, and the second reference signal is sent by the active unit to the terminal.

In some embodiments, the control module is configured to obtain the third channel information and the fourth channel information of the passive unit of the intelligent surface device by using an interpolation algorithm based on the first channel information and the second channel information.

In some embodiments, the control module is configured to obtain a device parameter reported by the intelligent surface device, where the device parameter includes at least one of the following:

a device type;

a device size;

a type of the active unit;

a location of the active unit;

a quantity of active units;

a capability of the active unit; or a capability of the passive unit.

In some embodiments, the control module is configured to send the control information of the unit array to the intelligent surface device, where the control information includes: an operating status of each passive unit of the intelligent surface device.

In some embodiments, the control module is configured to send a parameter requirement to the intelligent surface device, where the parameter requirement is used for enabling the intelligent surface device to determine an operating status of each passive unit of the intelligent surface device.

The parameter requirement includes at least one of the following:

a beam direction;

a channel measurement result between a base station and the terminal; or powers and phase relationships of a plurality of beams.

In some embodiments, the control module is configured to determine a beamforming parameter of the network side device and/or the terminal through channel measurement.

In some embodiments, the first reference signal and the second reference signal includes at least one of the following:

a synchronization signal and PBCH block;

a channel state information reference signal;

a demodulation reference signal;

a position reference signal;

a sounding reference signal;

a physical random access channel reference signal;

a side link reference signal; or a dedicated reference signal for channel measurement by the intelligent surface device.

In some embodiments, the first reference signal and the second reference signal adopts at least one manner in the following:

time division multiplexing;

frequency division multiplexing;

code division multiplexing; and beam sweeping.

In this way, the beam control apparatus for the intelligent surface device is provided in this embodiment of this application. In a case that the active unit supports signal sending, the active unit sends the first reference signal and the second reference signal to the network side device and the terminal, the first channel information and the second channel information of the active unit are separately obtained through channel measurement, channel estimation is performed on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

Based on the foregoing embodiment, in a case that the active unit supports signal receiving, the first measurement module is configured to:

send a third reference signal to the active unit; and obtain the first channel information sent by the active unit, where the first channel information is obtained by the active unit by performing channel measurement on the third reference signal.

In some embodiments, in a case that the active unit supports signal receiving, the second measurement module is configured to:

obtain the second channel information sent by the active unit, where the second channel information is obtained by the active unit by performing channel measurement on a fourth reference signal, and the fourth reference signal is sent by the terminal to the active unit.

In this way, the beam control apparatus for the intelligent surface device is provided in this embodiment of this application. In a case that the active unit supports signal receiving, the network side device and the terminal respectively send the third reference signal and the fourth reference signal to the active unit, the first channel information and the second channel information of the active unit are separately obtained through channel measurement, the RIS device performs channel estimation on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

The beam control apparatus for the intelligent surface device in this embodiment of this application may be an apparatus or an apparatus or electronic device with an operating system, or may be a component, an integrated circuit, or a chip in the terminal. The apparatus or the electronic device may be a mobile terminal or may be a non-mobile terminal. For example, the mobile terminal may include, but is not limited to, the foregoing enumerated types of the terminal 11, and the non-mobile terminal may be a server, a network attached storage (NAS), a personal computer (PC), a television (TV), a teller machine, a self-service machine, or the like. This is not specifically limited in this embodiment of this application.

The beam control apparatus for the intelligent surface device in this embodiment of this application may be an apparatus with an operating system. The operating system may be an Android operating system, may be an ios operating system, or may be another possible operating system. This is not specifically limited in the embodiments of this application.

The beam control apparatus for the intelligent surface device provided in this embodiment of this application can implement processes implemented by the method embodiments shown in FIG. 2 to FIG. 5, and achieve the same technical effects. To avoid repetition, details are not described herein again.

Figure 7:
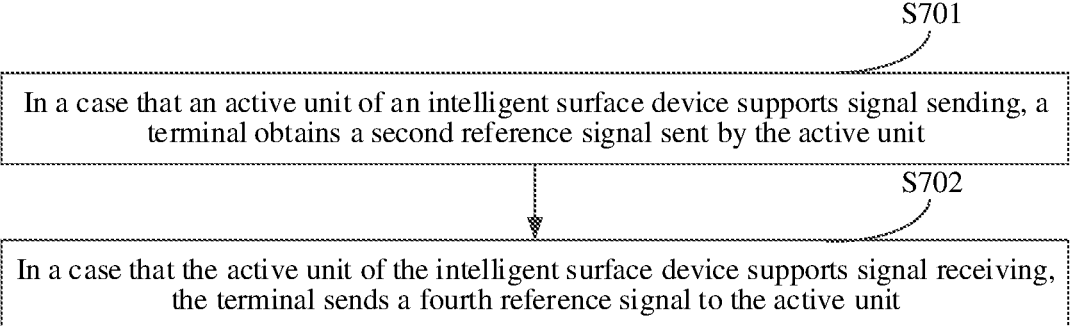
FIG. 7 is a schematic flowchart of another beam control method for an intelligent surface device according to an embodiment of this application.

FIG. 7 is a schematic flowchart of another beam control method for an intelligent surface device according to an embodiment of this application. As shown in FIG. 7, the method may be performed by a terminal. In other words, the method may be performed by software or hardware installed on the terminal. The method may be performed by using the following steps:

Step S701: In a case that an active unit of the intelligent surface device supports signal sending, the terminal obtains a second reference signal sent by the active unit.

Step S702: In a case that the active unit of the intelligent surface device supports signal receiving, the terminal sends a fourth reference signal to the active unit.

The second reference signal or the fourth reference signal is used for obtaining second channel information of the active unit, the second channel information is channel information between the terminal and the active unit, the second channel information is used for, in combination with first channel information, determining control information of a unit array of the intelligent surface device, the unit array includes the active unit and a passive unit of the intelligent surface device, and the first channel information is channel information between a network side device and the active unit.

In some embodiments, after the obtaining a second reference signal sent by the active unit, the method further includes:

performing channel measurement on the second reference signal to obtain the second channel information, and sending the second channel information to the network side device.

In some embodiments, the method further includes:

obtaining a parameter that is of the second reference signal or the fourth reference signal and that is configured by the network side device.

In some embodiments, the first reference signal and the second reference signal includes at least one of the following:

a channel state information reference signal;

a demodulation reference signal;

a position reference signal;

a sounding reference signal;

a physical random access channel reference signal;

a side link reference signal; or a dedicated reference signal for channel measurement by the intelligent surface device.

In some embodiments, the first reference signal and the second reference signal adopts at least one manner in the following:

time division multiplexing;

frequency division multiplexing;

code division multiplexing; and beam sweeping.

The beam control method for the intelligent surface device provided in this embodiment of this application can implement processes implemented by the method embodiments shown in FIG. 2 to FIG. 5, and achieve the same technical effects. To avoid repetition, details are not described herein again.

In this way, the beam control method for the intelligent surface device is provided in this embodiment of this application. Channel measurement is performed based on the active unit of the intelligent surface device supporting signal sending and/or receiving, to obtain the second channel information between the active unit and the terminal, and then the control information of the unit array of the intelligent surface device is determined with reference to the first channel information, which improves efficiency of channel measurement and implements accurate beam control on the intelligent surface device, and can support generation of forwarded beams of a complex intelligent surface device of multi-terminal and multi-base station.

It should be noted that, in the beam control method for the intelligent surface device provided in this embodiment of this application, an execution subject may be a beam control apparatus for the intelligent surface device, or a beam control module, in the beam control apparatus for the intelligent surface device, that is configured to perform the beam control method for the intelligent surface device. In this embodiment of this application, the beam control apparatus for the intelligent surface device provided in this embodiment of this application is described by using an example in which the beam control apparatus for the intelligent surface device performs the beam control method for the intelligent surface device.

Figure 8:
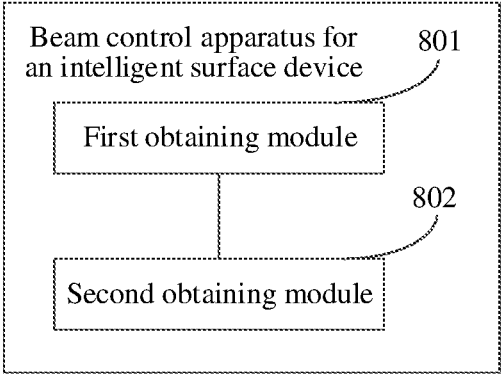
FIG. 8 is a schematic structural diagram of another beam control apparatus for an intelligent surface device according to an embodiment of this application.

FIG. 8 is a schematic structural diagram of another beam control apparatus for an intelligent surface device according to an embodiment of this application. As shown in FIG. 8, the apparatus includes: a first obtaining module 801 and a second obtaining module 802.

The first obtaining module 801 is configured to obtain, in a case that an active unit of the intelligent surface device supports signal sending, a second reference signal sent by the active unit. The second obtaining module 802 is configured to send, in a case that the active unit of the intelligent surface device supports signal receiving, a fourth reference signal to the active unit. The second reference signal or the fourth reference signal is used for obtaining second channel information of the active unit, the second channel information is channel information between the terminal and the active unit, the second channel information is used for, in combination with first channel information, determining control information of a unit array of the intelligent surface device, the unit array includes the active unit and a passive unit of the intelligent surface device, and the first channel information is channel information between a network side device and the active unit.

In some embodiments, the first obtaining module is configured to perform channel measurement on the second reference signal to obtain the second channel information, and send the second channel information to the network side device.

In some embodiments, the first obtaining module or the second obtaining module is configured to obtain a parameter that is of the second reference signal or the fourth reference signal and that is configured by the network side device.

In some embodiments, the first reference signal and the second reference signal includes at least one of the following:

a channel state information reference signal;

a demodulation reference signal;

a position reference signal;

a sounding reference signal;

a physical random access channel reference signal;

a side link reference signal; or a dedicated reference signal for channel measurement by the intelligent surface device.

In some embodiments, the first reference signal and the second reference signal adopts at least one manner in the following:

time division multiplexing;

frequency division multiplexing;

code division multiplexing; and beam sweeping.

In this way, the beam control apparatus for the intelligent surface device is provided in this embodiment of this application. Channel measurement is performed based on the active unit of the intelligent surface device supporting signal sending and/or receiving, to obtain the second channel information between the active unit and the terminal, and then the control information of the unit array of the intelligent surface device is determined with reference to the first channel information, which improves efficiency of channel measurement and implements accurate beam control on the intelligent surface device, and can support generation of forwarded beams of a complex intelligent surface device of multi-terminal and multi-base station.

The beam control apparatus for the intelligent surface device in this embodiment of this application may be an apparatus or an apparatus or electronic device with an operating system, or may be a component, an integrated circuit, or a chip in the terminal. The apparatus or the electronic device may be a mobile terminal or may be a non-mobile terminal. For example, the mobile terminal may include, but is not limited to, the foregoing enumerated types of the terminal 11, and the non-mobile terminal may be a server, a network attached storage (NAS), a personal computer (PC), a television (TV), a teller machine, a self-service machine, or the like. This is not specifically limited in this embodiment of this application.

The beam control apparatus for the intelligent surface device provided in this embodiment of this application can implement processes implemented by the method embodiment shown in FIG. 7, and achieve the same technical effects. To avoid repetition, details are not described herein again.

Figure 9:
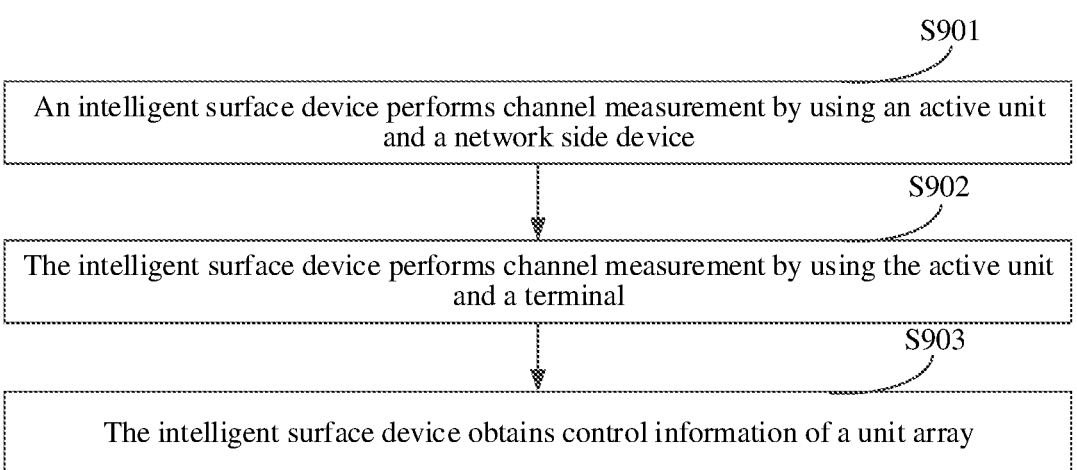
FIG. 9 is a schematic flowchart of another beam control method for an intelligent surface device according to an embodiment of this application.

FIG. 9 is a schematic flowchart of another beam control method for an intelligent surface device according to an embodiment of this application. As shown in FIG. 9, the method may be performed by the intelligent surface device. The method may be performed by using the following steps:

Step S901: The intelligent surface device performs channel measurement by using an active unit and a network side device, where the channel measurement of the active unit and the network side device is for obtaining first channel information of the active unit, and the first channel information is channel information between the network side device and the active unit.

Step S902: The intelligent surface device performs channel measurement by using the active unit and a terminal, where the channel measurement of the active unit and the terminal is for obtaining second channel information, and the second channel information is channel information between the terminal and the active unit.

Step S903: The intelligent surface device obtains control information of a unit array, where the control information is obtained based on the first channel information and the second channel information, and the unit array includes the active unit and a passive unit of the intelligent surface device.

The beam control method provided in this embodiment of this application can implement the method embodiment of the steps shown in FIG. 2, and achieve the same technical effects. Repetition is not described in detail herein again.

In this way, the beam control method for the intelligent surface device is provided in this embodiment of this application. Channel measurement is performed by using the active unit of the intelligent surface device to obtain the first channel information and the second channel information, and then the control information of the unit array of the intelligent surface device is determined based on the first channel information and the second channel information, which improves efficiency of channel measurement and implements accurate beam control on the intelligent surface device, and can support generation of forwarded beams of a complex intelligent surface device of multi-terminal and multi-base station.

Based on the foregoing embodiment, in an implementation, in a case that the active unit supports signal sending, step S901 includes:

sending a first reference signal to the network side device, so that the network side device obtains the first channel information by performing channel measurement on the first reference signal.

In an implementation, in a case that the active unit supports signal sending, step S902 includes:

sending a second reference signal to the terminal, so that the terminal obtains the second channel information by performing channel measurement on the second reference signal.

In an implementation, step S903 includes:

receiving the control information of the unit array that is sent by the network side device.

In an implementation, the method further includes:

reporting a device parameter of the intelligent surface device to the network side device, where the device parameter includes at least one of the following:

a device type;
a device size;
a type of the active unit;
a location of the active unit;
a quantity of active units;
a capability of the active unit; or
a capability of the passive unit.

In an implementation, the first reference signal and the second reference signal includes at least one of the following:

a synchronization signal and PBCH block;
a channel state information reference signal;
a demodulation reference signal;
a position reference signal;
a sounding reference signal;
a physical random access channel reference signal;
a side link reference signal; or
a dedicated reference signal for channel measurement by the intelligent surface device.

In an implementation, the first reference signal and the second reference signal adopts at least one manner in the following:

time division multiplexing;
frequency division multiplexing;
code division multiplexing; and
beam sweeping.

The beam control method provided in this embodiment of this application can implement the method embodiments of the steps shown in FIG. 3 and FIG. 4, and achieve the same technical effects. Repetition is not described in detail herein again.

In this way, the beam control method for the intelligent surface device is provided in this embodiment of this application. In a case that the active unit supports signal sending, the active unit sends the first reference signal and the second reference signal to the network side device and the terminal, the first channel information and the second channel information of the active unit are separately obtained through channel measurement, channel estimation is performed on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

Based on the foregoing embodiment, in an implementation, in a case that the active unit supports signal receiving, step S901 includes:

receiving a third reference signal sent by the network side device, and performing channel measurement on the third reference signal to obtain the first channel information.

In an implementation, in a case that the active unit supports signal receiving, step S902 includes:

receiving a fourth reference signal sent by the terminal, and performing channel measurement on the fourth reference signal to obtain the second channel information.

In an implementation, the method further includes:

reporting the first channel information and/or the second channel information to the network side device.

In an implementation, step S903 includes:

obtaining third channel information and fourth channel information of the passive unit of the intelligent surface device based on the first channel information and the second channel information; and obtaining the control information of the unit array of the intelligent surface device based on the third channel information and the fourth channel information, where the control information includes: an operating status of each passive unit of the intelligent surface device.

In an implementation, the obtaining third channel information and fourth channel information of the passive unit of the intelligent surface device based on the first channel information and the second channel information includes:

obtaining the third channel information and the fourth channel information of the passive unit of the intelligent surface device by using an interpolation algorithm based on the first channel information and the second channel information.

In an implementation, the method further includes:

receiving a parameter requirement sent by the network side device, where the parameter requirement is used for enabling the intelligent surface device to determine an operating status of each passive unit of the intelligent surface device.

The parameter requirement includes at least one of the following:

a beam direction;

a channel measurement result between a base station and the terminal; or powers and phase relationships of a plurality of beams.

In an implementation, the method further includes:

reporting a device parameter of the intelligent surface device to the network side device, where the device parameter includes at least one of the following:

a device type;

a device size;

a type of the active unit;

a location of the active unit;

a quantity of active units;

a capability of the active unit; or a capability of the passive unit.

In an implementation, the first reference signal and the second reference signal includes at least one of the following:

a synchronization signal and PBCH block;

a channel state information reference signal;

a demodulation reference signal;

a position reference signal;

a sounding reference signal;

a physical random access channel reference signal;

a side link reference signal; or a dedicated reference signal for channel measurement by the intelligent surface device.

In an implementation, the first reference signal and the second reference signal adopts at least one manner in the following:

time division multiplexing;

frequency division multiplexing;

code division multiplexing; and beam sweeping.

The beam control method in this embodiment of this application can implement the method embodiment of the steps shown in FIG. 5, and achieve the same technical effects. Repetition is not described in detail herein again.

In this way, the beam control method for the intelligent surface device is provided in this embodiment of this application. In a case that the active unit supports signal receiving, the network side device and the terminal respectively send the third reference signal and the fourth reference signal to the active unit, the first channel information and the second channel information of the active unit are separately obtained through channel measurement, the RIS device performs channel estimation on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

Figure 10:
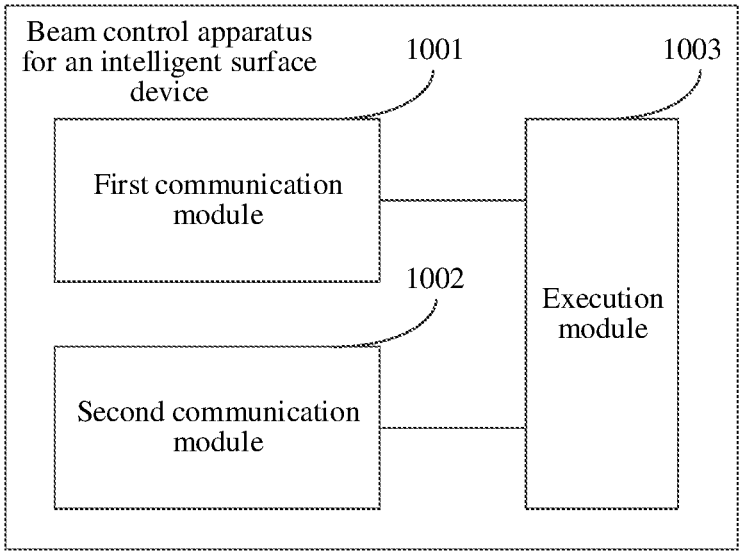
FIG. 10 is a schematic structural diagram of another beam control apparatus for an intelligent surface device according to an embodiment of this application.

FIG. 10 is a schematic structural diagram of another beam control apparatus for an intelligent surface device according to an embodiment of this application. As shown in FIG. 10, the apparatus includes: a first communication module 1001, a second communication module 1002, and an execution module 1003.

The first communication module 1001 is configured to perform channel measurement by using an active unit and a network side device, where the channel measurement of the active unit and the network side device is for obtaining first channel information of the active unit, and the first channel information is channel information between the network side device and the active unit. The second communication module 1002 is configured to perform channel measurement by using the active unit and a terminal, where the channel measurement of the active unit and the terminal is for obtaining second channel information, and the second channel information is channel information between the terminal and the active unit. The execution module 1003 is configured to obtain control information of a unit array, where the control information is obtained based on the first channel information and the second channel information, and the unit array includes the active unit and a passive unit of the intelligent surface device.

In this way, the beam control apparatus for the intelligent surface device is provided in this embodiment of this application. The beam control apparatus performs channel measurement by using the active unit of the intelligent surface device to obtain the first channel information and the second channel information, and then determines the control information of the unit array of the intelligent surface device based on the first channel information and the second channel information, which improves efficiency of channel measurement and implements accurate beam control on the intelligent surface device, and can support generation of forwarded beams of a complex intelligent surface device of multi-terminal and multi-base station.

Based on the foregoing embodiment, the first communication module is configured to send a first reference signal to the network side device, so that the network side device obtains the first channel information by performing channel measurement on the first reference signal.

In an implementation, in a case that the active unit supports signal sending, the second communication module is configured to send a second reference signal to the terminal, so that the terminal obtains the second channel information by performing channel measurement on the second reference signal.

In an implementation, the execution module is configured to receive the control information of the unit array that is sent by the network side device.

In an implementation, the execution module is configured to report a device parameter of the intelligent surface device that the network side device, where the device parameter includes at least one of the following:

a device type;

a device size;

a type of the active unit;

a location of the active unit;

a quantity of active units;

a capability of the active unit; or a capability of the passive unit.

In an implementation, the first reference signal and the second reference signal includes at least one of the following:

a synchronization signal and PBCH block;

a channel state information reference signal;

a demodulation reference signal;

a position reference signal;

a sounding reference signal;

a physical random access channel reference signal;

a side link reference signal; or a dedicated reference signal for channel measurement by the intelligent surface device.

In an implementation, the first reference signal and the second reference signal adopts at least one manner in the following:

time division multiplexing;

frequency division multiplexing;

code division multiplexing; and beam sweeping.

In this way, the beam control apparatus for the intelligent surface device is provided in this embodiment of this application. In a case that the active unit supports signal sending, the active unit sends the first reference signal and the second reference signal to the network side device and the terminal, the first channel information and the second channel information of the active unit are separately obtained through channel measurement, channel estimation is performed on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

Based on the foregoing embodiment, in a case that the active unit supports signal receiving, the first communication module is configured to receive a third reference signal sent by the network side device, and perform channel measurement on the third reference signal to obtain the first channel information.

In an implementation, in a case that the active unit supports signal receiving, the second communication module is configured to receive a fourth reference signal sent by the terminal, and perform channel measurement on the fourth reference signal to obtain the second channel information.

In an implementation, the execution module is configured to report the first channel information and/or the second channel information to the network side device.

In an implementation, the execution module is configured to obtain third channel information and fourth channel information of the passive unit of the intelligent surface device based on the first channel information and the second channel information; and obtain the control information of the unit array of the intelligent surface device based on the third channel information and the fourth channel information, where the control information includes: an operating status of each passive unit of the intelligent surface device.

In an implementation, the execution module is configured to obtain the third channel information and the fourth channel information of the passive unit of the intelligent surface device by using an interpolation algorithm based on the first channel information and the second channel information.

In an implementation, the execution module is configured to receive a parameter requirement sent by the network side device, where the parameter requirement is used for enabling the intelligent surface device to determine an operating status of each passive unit of the intelligent surface device.

The parameter requirement includes at least one of the following:

a beam direction;

a channel measurement result between a base station and the terminal; or powers and phase relationships of a plurality of beams.

In an implementation, the execution module is configured to report a device parameter of the intelligent surface device that the network side device, where the device parameter includes at least one of the following:

a device type;

a device size;

a type of the active unit;

a location of the active unit;

a quantity of active units;

a capability of the active unit; or a capability of the passive unit.

In an implementation, the first reference signal and the second reference signal includes at least one of the following:

a synchronization signal and PBCH block;

a channel state information reference signal;

a demodulation reference signal;

a position reference signal;

a sounding reference signal;

a physical random access channel reference signal;

a side link reference signal; or a dedicated reference signal for channel measurement by the intelligent surface device.

In an implementation, the first reference signal and the second reference signal adopts at least one manner in the following:

time division multiplexing;

frequency division multiplexing;

code division multiplexing; and beam sweeping.

In this way, the beam control apparatus for the intelligent surface device is provided in this embodiment of this application. In a case that the active unit supports signal receiving, the network side device and the terminal respectively send the third reference signal and the fourth reference signal to the active unit, the first channel information and the second channel information of the active unit are separately obtained through channel measurement, the RIS device performs channel estimation on the third channel information and the fourth channel information of the passive unit based on the first channel information and the second channel information of the active unit, and then the control information of the unit array of the intelligent surface device is obtained based on the channel information of the units. In this embodiment of this application, the active unit is used to perform segmented channel estimation, to avoid a complex channel estimation method for the cascading channels of network side device-intelligent surface device-terminal, which improves efficiency of channel measurement and implements accurate beam control on the intelligent surface device, and can support generation of forwarded beams of a complex intelligent surface device of multi-terminal and multi-base station.

The beam control apparatus for the intelligent surface device in this embodiment of this application may be an apparatus, or an apparatus or electronic device with an operating system. This is not specifically limited in this embodiment of this application.

The beam control apparatus for the intelligent surface device provided in this embodiment of this application can implement processes implemented by the method embodiment shown in FIG. 9, and achieve the same technical effects. To avoid repetition, details are not described herein again.

Figure 11:
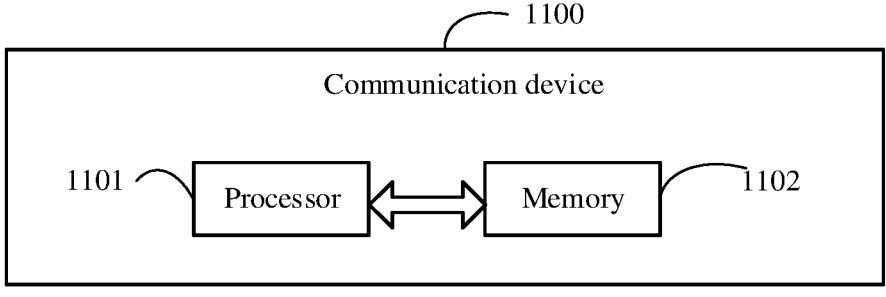
FIG. 11 is a schematic structural diagram of a communication device according to an embodiment of this application.

Optionally, as shown in FIG. 11, an embodiment of this application further provides a communication device 1100, including a processor 1101, a memory 1102, and a program or an instruction stored in the memory 1102 and executable on the processor 1101. For example, when the communication device 1100 is a terminal, the program or the instruction, when executed by the processor 1101, implements the processes of the embodiments of the beam control method for the intelligent surface device, and can achieve the same technical effects. When the communication device 1100 is a network side device, the program or the instruction, when executed by the processor 1101, implements the processes of the embodiments of the beam control method for the intelligent surface device, and can achieve the same technical effects. To avoid repetition, details are not described herein again.

An embodiment of this application further provides a network side device, including a processor and a communication interface. The processor is configured to process first channel information and second channel information and determine control information of a unit array of an intelligent surface device. The communication interface is configured to obtain the first channel information of an active unit of the intelligent surface device, and is further configured to obtain the second channel information of an active unit of the intelligent surface device. The network side device embodiment corresponds to the foregoing network side device method embodiment, and the implementation processes and implementations of the foregoing method embodiment are all applicable to the network side device embodiment, and can achieve the same technical effects.

Figure 12:
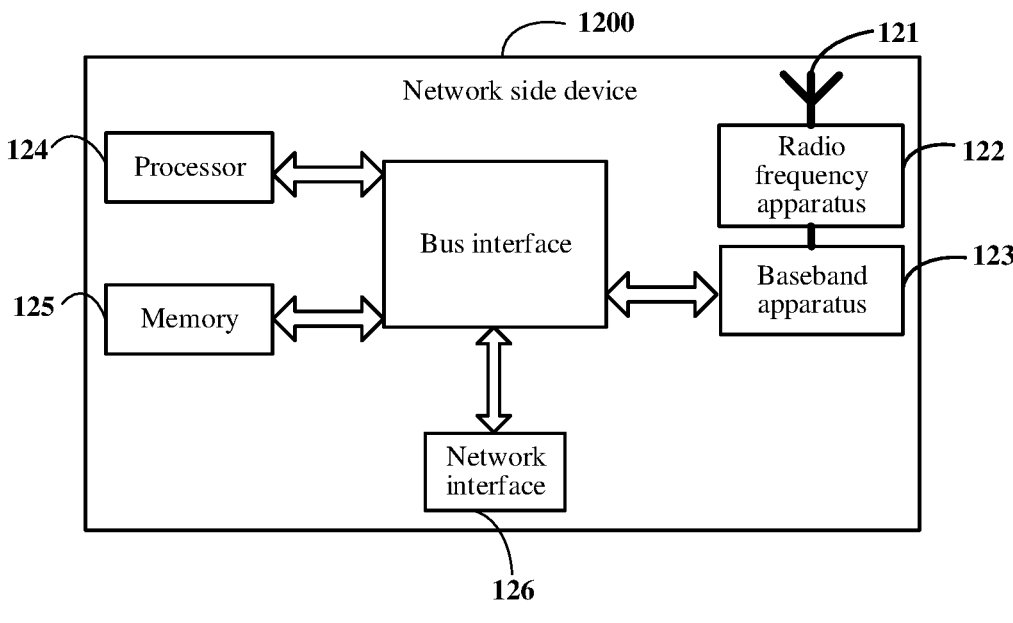
FIG. 12 is a schematic structural diagram of a terminal for implementing an embodiment of this application.

An embodiment of this application further provides a network side device. As shown in FIG. 12, a network side device 1200 includes: an antenna 121, a radio frequency apparatus 122, and a baseband apparatus 123. The antenna

121 is connected to the radio frequency apparatus 122. In an uplink direction, the radio frequency apparatus 122 receives information by using the antenna 121, and sends the received information to the baseband apparatus 123 for processing. In a downlink direction, the baseband apparatus 123 processes to-be-sent information, and sends the information to the radio frequency apparatus 122. The radio frequency apparatus 122 processes the received information and then sends the information by using the antenna 121.

A baseband processing apparatus may be located in the baseband apparatus 123. The method performed by the network side device in the foregoing embodiment may be implemented in the baseband apparatus 123. The baseband apparatus 123 includes a processor 124 and a memory 125.

The baseband apparatus 123 may include, for example, at least one baseband plate. A plurality of chips are disposed on the baseband plate. As shown in FIG. 12, one of the plurality of chips is, for example, the processor 124, and is connected to the memory 125, to invoke a program in the memory 125 to perform operations of the network side device described in the foregoing method embodiment.

The baseband apparatus 123 may further include a network interface 126, configured to exchange information with the radio frequency apparatus 122. The interface is, for example, a common public radio interface (CPRI).

The network side device in this embodiment of the present invention further includes: an instruction or a program stored in the memory 125 and executable on the processor 124. The processor 124 may invoke the instruction or the program in the memory 125 to perform the method performed by the modules shown in FIG. 6, and achieve the same technical effects. To avoid repetition, details are not described herein again.

Figure 13:
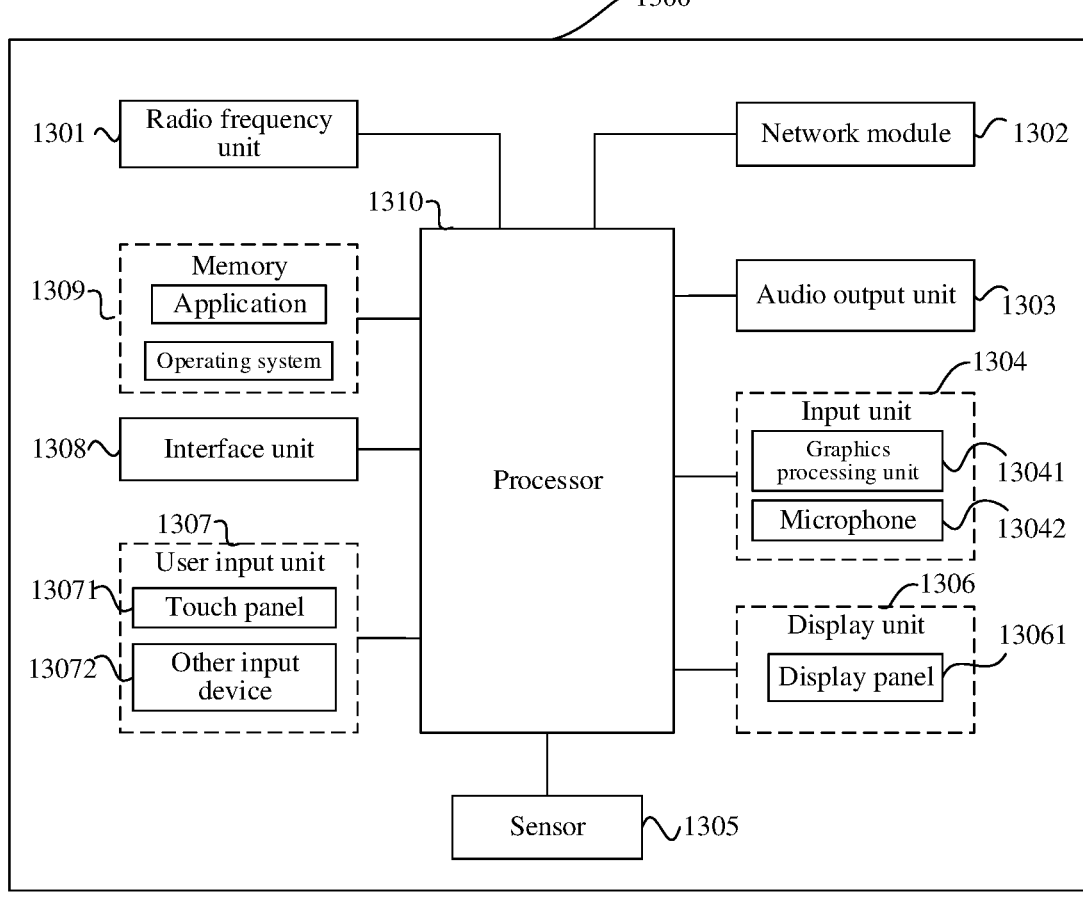
FIG. 13 is a schematic structural diagram of a network side device for implementing an embodiment of this application.

An embodiment of this application further provides a terminal, including a processor and a communication interface. The communication interface is configured to: in a case that an active unit of an intelligent surface device supports signal sending, obtain a second reference signal sent by the active unit; and in a case that the active unit of the intelligent surface device supports signal receiving, send a fourth reference signal to the active unit. The terminal embodiment corresponds to the foregoing terminal side method embodiment, and the implementation processes and implementations of the foregoing method embodiment are all applicable to the terminal embodiment, and can achieve the same technical effects. FIG. 13 is a schematic diagram of a hardware structure of a terminal for implementing an embodiment of this application.

A terminal 1300 includes but is not limited to: at least some of components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art may understand that, the terminal 1300 may further include a power supply (such as a battery) for supplying power to the components. The power supply may be logically connected to the processor 1310 by using a power management system, thereby implementing functions such as charging, discharging, and power consumption management by using the power supply management system. The terminal structure shown in FIG. 13 constitutes no limitation on the terminal, and the terminal may include more or fewer components than those shown in the figure, or some components may be combined, or a different component deployment may be used. Details are not described herein again.

It should be understood that, in this embodiment of this application, the input unit 1304 may include a graphics processing unit (GPU) 13041 and a microphone 13042. The graphics processing unit 13041 performs processing on image data of a static picture or a video that is obtained by an image acquisition device (for example, a camera) in a video acquisition mode or an image acquisition mode. The display unit 1306 may include a display panel 13061, the display panel 13061 may be configured in a form such as a liquid crystal display or an organic light-emitting diode. The user input unit 1307 includes a touch panel 13071 and another input device 13072. The touch panel 13071 may also be referred to as a touchscreen. The touch panel 13071 may include two parts: a touch detection apparatus and a touch controller. The another input device 13072 may include, but is not limited to, a physical keyboard, a functional key (such as a volume control key or a switch key), a track ball, a mouse, and a joystick, which are not described herein in detail.

In this embodiment of this application, after the radio frequency unit 1301 receives downlink data from a network side device, the downlink data is sent to the processor 1310 for processing. In addition, uplink data is sent to the network side device. The radio frequency unit 1301 usually includes, but is not limited to, an antenna, at least one amplifier, a transceiver, a coupler, a low noise amplifier, a duplexer, and the like.

The memory 1309 is configured to store a software program or an instruction and various data. The memory 1309 may mainly include a program storage or instruction area and a data storage area. The program storage or instruction area may store an operating system, an application or an instruction required by at least one function (for example, a sound playing function and an image playing function), or the like. In addition, the memory 1309 may include a cache random access memory, and may further include a non-transitory memory. The non-transitory memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or other non-transitory solid-state storage devices. The cache random access memory may be random access memory (RAM), a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), and a direct rambus random access memory (DR RAM). The memory 1309 in this embodiment of this application includes, but is not limited to, these memories and any other suitable types of memories.

The processor 1310 may include one or more processing units. Optionally, the processor 1310 may integrate an application processor and a modem processor. The application processor mainly processes an operating system, a user interface, an application or an instruction, and the like. The modem processor mainly processes wireless communication, such as a baseband processor. It may be understood that the modem processor may either not be integrated into the processor 1310.

The radio frequency unit 1301 is configured to obtain, in a case that the active unit of the intelligent surface device supports signal sending, the second reference signal sent by the active unit.

The radio frequency unit 1301 is configured to send, in a case that the active unit of the intelligent surface device supports signal receiving, the fourth reference signal to the active unit.

In some embodiments, the processor 1310 is configured to perform channel measurement on the second reference signal to obtain second channel information.

The radio frequency unit 1301 is configured to send the second channel information to the network side device.

In some embodiments, the radio frequency unit 1301 is configured to obtain a parameter that is of the second reference signal or the fourth reference signal and that is configured by the network side device.

In some embodiments, the first reference signal and the second reference signal includes at least one of the following:

a channel state information reference signal;

a demodulation reference signal;

a position reference signal;

a sounding reference signal;

a physical random access channel reference signal;

a side link reference signal; or a dedicated reference signal for channel measurement by the intelligent surface device.

In some embodiments, the first reference signal and the second reference signal adopts at least one manner in the following: time division multiplexing; frequency division multiplexing; code division multiplexing; and beam sweeping.

In this way, according to this embodiment of this application, efficiency of channel measurement is improved, and accurate beam control on the intelligent surface device is implemented, and generation of forwarded beams of a complex intelligent surface device of multi-terminal and multi-base station can be generated.

An embodiment of this application further provides a non-transitory readable storage medium. The non-transitory readable storage medium stores a program or an instruction, and the program or the instruction, when executed by a processor, implements the processes of the embodiments of the beam control method for an intelligent surface device, and can achieve the same technical effects. To avoid repetition, details are not described herein again.

The processor is the processor in the terminal of the foregoing embodiment. The non-transitory readable storage medium includes a non-transitory computer-readable storage medium, for example, a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction, to implement the processes of the embodiments of beam control method for an intelligent surface device, and can achieve the same technical effects. To avoid repetition, details are not described herein again.

It should be understood that, the chip mentioned in this embodiment of this application may also be referred to as a system-level chip, a system chip, a chip system, a system-on-chip, or the like.

It should be noted that, in this specification, terms "comprise", "include", and any variants thereof are intended to cover a non-exclusive inclusion. Therefore, a process, a method, an object, or an apparatus that includes a series of elements not only includes such elements, but also includes other elements not specified expressly, or may further include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions. For example, the described method may be performed in a sequence different from the description, and various steps may be added, removed, or combined. In addition, features described with reference to some examples may be combined in other examples.

Through the foregoing description in the foregoing implementations, a person skilled in the art can clearly learn that the foregoing embodiment methods may be implemented by using software in combination with a necessary universal hardware platform. Certainly, the embodiment methods may be implemented by using hardware, but the former is a better implementation in many cases. Based on such an understanding, the technical solutions of this application essentially or the part contributing to the prior art may be implemented in a form of a computer software product. The computer software product is stored in a storage medium (such as a ROM/RAM, a magnetic disk, or an optical disc) and includes several instructions for instructing a terminal (which may be a mobile phone, a computer, a server, an air conditioner, a network side device, or the like) to perform the methods described in the embodiments of this application.

The embodiments of this application have been described above with reference to the accompanying drawings. This application is not limited to the embodiments described above, and the embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A beam control method for an intelligent surface device, comprising:

obtaining, by a network side device, first channel information of an active unit of the intelligent surface device, wherein the first channel information is channel information between the network side device and the active unit;

obtaining, by the network side device, second channel information of the active unit of the intelligent surface device, wherein the second channel information is channel information between a terminal and the active unit; and determining, by the network side device, control information of a unit array of the intelligent surface device based on the first channel information and the second channel information, wherein the unit array comprises the active unit and a passive unit of the intelligent surface device;

wherein the determining the control information of the unit array of the intelligent surface device based on the first channel information and the second channel information comprises:

obtaining third channel information and fourth channel information of the passive unit of the intelligent surface device by using an interpolation algorithm based on the first channel information and the second channel information, wherein the third channel information is channel information between the network side device and the passive unit, and the fourth channel information is channel information between the terminal and the passive unit; and obtaining the control information of the unit array of the intelligent surface device based on the third channel information and the fourth channel information;

wherein after the determining the control information of the unit array of the intelligent surface device, the method further comprises:

sending the control information of the unit array to the intelligent surface device, wherein the control information comprises: an operating status of each passive unit of the intelligent surface device.

2. The method according to claim 1, wherein in a case that the active unit supports signal sending, the obtaining the first channel information of the active unit of the intelligent surface device comprises:

receiving a first reference signal sent by the active unit; and obtaining the first channel information of the active unit through channel measurement on the first reference signal;

or in a case that the active unit supports signal sending, the obtaining the second channel information of the active unit of the intelligent surface device comprises:

receiving the second channel information sent by the terminal, wherein the second channel information is obtained by the terminal through channel measurement on a second reference signal, and the second reference signal is sent by the active unit to the terminal.

3. The method according to claim 1, wherein in a case that the active unit supports signal receiving, the obtaining the first channel information of the active unit of the intelligent surface device comprises:

sending a third reference signal to the active unit; and obtaining the first channel information sent by the active unit, wherein the first channel information is obtained by the active unit by performing channel measurement on the third reference signal;

or in a case that the active unit supports signal receiving, the obtaining the second channel information of the active unit of the intelligent surface device comprises:

obtaining the second channel information sent by the active unit, wherein the second channel information is obtained by the active unit by performing channel measurement on a fourth reference signal, and the fourth reference signal is sent by the terminal to the active unit.

4. The method according to claim 1, wherein before the network side device obtains the first channel information and/or the second channel information of the active unit of the intelligent surface device, the method further comprises:

obtaining a device parameter reported by the intelligent surface device, wherein the device parameter comprises at least one of following:

35 a device type;
a device size;
a type of the active unit;
a location of the active unit;
a quantity of active units;
a capability of the active unit; or
a capability of the passive unit.

5. The method according to claim 1, wherein after the determining the control information of the unit array of the intelligent surface device, the method further comprises:
sending the control information of the unit array to the intelligent surface device, wherein the control information comprises: an operating status of each passive unit of the intelligent surface device;
or
determining a beamforming parameter of the network side device and/or the terminal through channel measurement.

6. The method according to claim 1, wherein the method further comprises:
sending a parameter requirement to the intelligent surface device, wherein the parameter requirement is used for enabling the intelligent surface device to determine the operating status of each passive unit of the intelligent surface device; and
the parameter requirement comprises at least one of following:
a beam direction;
a channel measurement result between a base station and the terminal; or
powers and phase relationships of a plurality of beams.

7. The method according to claim 2, wherein the first reference signal and the second reference signal comprises at least one of following:
a synchronization signal and PBCH block;
a channel state information reference signal;
a demodulation reference signal;
a position reference signal;
a sounding reference signal;
a physical random access channel reference signal;
a side link reference signal; or
a dedicated reference signal for channel measurement by the intelligent surface device;
or
the first reference signal and the second reference signal adopts at least one manner in following:
time division multiplexing;
frequency division multiplexing;
code division multiplexing; and
beam sweeping.

8. A beam control method for an intelligent surface device, comprising:
performing, by the intelligent surface device, channel measurement by using an active unit and a network side device, wherein the channel measurement of the active unit and the network side device is for obtaining first channel information of the active unit, and the first channel information is channel information between the network side device and the active unit;
performing, by the intelligent surface device, channel measurement by using the active unit and a terminal, wherein the channel measurement of the active unit and the terminal is for obtaining second channel information, and the second channel information is channel information between the terminal and the active unit; and

obtaining, by the intelligent surface device, control information of a unit array, wherein the control information is obtained based on the first channel information and the second channel information, and the unit array comprises the active unit and a passive unit of the intelligent surface device;
wherein the method further comprises:
reporting the first channel information and/or the second channel information to the network side device;
wherein the obtaining the control information of the unit array comprises:
receiving the control information of the unit array that is sent by the network side device;
wherein the obtaining the control information of the unit array comprises:
obtaining third channel information and fourth channel information of the passive unit of the intelligent surface device by using an interpolation algorithm based on the first channel information and the second channel information; and
obtaining the control information of the unit array of the intelligent surface device based on the third channel information and the fourth channel information, wherein the control information comprises: an operating status of each passive unit of the intelligent surface device.

9. The method according to claim 8, wherein in a case that the active unit supports signal sending, the performing channel measurement by using the active unit and the network side device comprises:
sending a first reference signal to the network side device, so that the network side device obtains the first channel information by performing channel measurement on the first reference signal;
or
in a case that the active unit supports signal sending, the performing channel measurement by using the active unit and the terminal comprises:
sending a second reference signal to the terminal, so that the terminal obtains the second channel information by performing channel measurement on the second reference signal.

10. The method according to claim 8, wherein in a case that the active unit supports signal receiving, the performing channel measurement by using the active unit and the network side device comprises:
receiving a third reference signal sent by the network side device, and performing channel measurement on the third reference signal to obtain the first channel information;
or
in a case that the active unit supports signal receiving, the performing channel measurement by using the active unit and the terminal comprises:
receiving a fourth reference signal sent by the terminal, and performing channel measurement on the fourth reference signal to obtain the second channel information.

11. The method according to claim 8, wherein the method further comprises:
receiving a parameter requirement sent by the network side device, wherein the parameter requirement is used for enabling the intelligent surface device to determine the operating status of each passive unit of the intelligent surface device; and the parameter requirement comprises at least one of following:

a beam direction;

a channel measurement result between a base station and the terminal; or powers and phase relationships of a plurality of beams; or the method further comprises:

reporting a device parameter of the intelligent surface device to the network side device, wherein the device parameter comprises at least one of following:

a device type;

a device size;

a type of the active unit;

a location of the active unit;

a quantity of active units;

a capability of the active unit; or a capability of the passive unit.

12. The method according to claim 9, wherein the first reference signal and the second reference signal comprises at least one of following:

a synchronization signal and PBCH block;

a channel state information reference signal;

a demodulation reference signal;

a position reference signal;

a sounding reference signal;

a physical random access channel reference signal;

a side link reference signal; or a dedicated reference signal for channel measurement by the intelligent surface device;

or the first reference signal and the second reference signal adopts at least one manner in following:

time division multiplexing;

frequency division multiplexing;

code division multiplexing; and beam sweeping.

\* \* \* \* \*